(12) United States Patent
Hu et al.

(10) Patent No.: US 11,409,269 B2
(45) Date of Patent: Aug. 9, 2022

(54) WORKFLOW OF AN APPARATUS

(71) Applicant: ABB Schweiz AG, Baden (CH)

(72) Inventors: Zhongliang Hu, Helsinki (FI); Mikko Kohvakka, Helsinki (FI); Teemu Tanila, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/891,384

(22) Filed: Jun. 3, 2020

(65) Prior Publication Data
US 2020/0379446 A1 Dec. 3, 2020

(30) Foreign Application Priority Data
Jun. 3, 2019 (EP) .................................... 19177984

(51) Int. Cl.
*G05B 19/418* (2006.01)
*G06F 8/656* (2018.01)

(52) U.S. Cl.
CPC ..... *G05B 19/4187* (2013.01); *G05B 19/4188* (2013.01); *G05B 19/41835* (2013.01); *G06F 8/656* (2018.02)

(58) Field of Classification Search
None
See application file for complete search history.

(56) References Cited

U.S. PATENT DOCUMENTS

| | | | | |
|---|---|---|---|---|
| 6,708,329 B1* | 3/2004 | Whitehill | ................ | G06F 30/33 717/136 |
| 7,233,830 B1* | 6/2007 | Callaghan | .......... | G05B 19/4188 700/20 |
| 8,933,827 B2* | 1/2015 | Okayama | .............. | G06F 40/143 341/55 |
| 9,336,288 B2* | 5/2016 | Mundlapudi | ......... | G06F 16/254 |
| 9,551,983 B2* | 1/2017 | Cooper | .................. | G06Q 10/06 |
| 10,469,317 B1* | 11/2019 | Jiang | .................... | G06F 9/45504 |
| 2008/0059214 A1* | 3/2008 | Vinberg | .............. | G06F 21/6236 709/221 |

(Continued)

FOREIGN PATENT DOCUMENTS

| | | |
|---|---|---|
| CN | 101013362 A | 8/2007 |
| CN | 108431803 A | 8/2018 |

(Continued)

OTHER PUBLICATIONS

F. Praus, W. Granzer and W. Kastner, "Enhanced control application development in Building Automation," 2009 7th IEEE International Conference on Industrial Informatics, 2009, pp. 390-395, doi: 10.1109/INDIN.2009.5195836. (Year: 2009).*

(Continued)

*Primary Examiner* — Andrew M. Lyons
(74) *Attorney, Agent, or Firm* — Leydig, Voit & Mayer, Ltd.

(57) ABSTRACT

A system including means for creating a workflow by receiving user input for combining a plurality of guidance elements, means for visually displaying the guidance elements and the workflow, means for saving the combination of the plurality of guidance elements into a file, means for obtaining the file using an application comprised in a mobile apparatus, means for executing the plurality of guidance elements combined in the file by the application.

17 Claims, 5 Drawing Sheets

(56) References Cited

U.S. PATENT DOCUMENTS

| | | | |
|---|---|---|---|
| 2008/0244565 A1* | 10/2008 | Levidow | G06F 9/5038 717/176 |
| 2009/0044185 A1* | 2/2009 | Krivopaltsev | H04L 41/0806 717/173 |
| 2009/0172670 A1* | 7/2009 | Bobak | G06F 8/30 718/100 |
| 2012/0265324 A1* | 10/2012 | Colombo | G05B 19/4188 700/95 |
| 2013/0123963 A1 | 5/2013 | Cooper et al. | |
| 2015/0230044 A1* | 8/2015 | Paun | H04L 67/12 455/41.2 |
| 2015/0277867 A1* | 10/2015 | Hasabnis | G06F 8/433 717/164 |
| 2017/0214541 A1* | 7/2017 | Brun | H04L 12/2803 |
| 2018/0285092 A1* | 10/2018 | Raman | H04L 67/34 |
| 2019/0004776 A1* | 1/2019 | Maclennan | G06F 8/47 |
| 2019/0028360 A1* | 1/2019 | Douglas | H04L 41/22 |
| 2020/0134068 A1* | 4/2020 | Kashyap | G06F 16/9024 |
| 2020/0169619 A1* | 5/2020 | Bedi | G06F 8/313 |

FOREIGN PATENT DOCUMENTS

| | | |
|---|---|---|
| DE | 102017108539 A1 | 10/2018 |
| EP | 2837979 A1 | 2/2015 |
| EP | 3065010 A1 | 9/2016 |

OTHER PUBLICATIONS

European Patent Office, Extended Search Report issued in corresponding Application No. 19177984.2, dated Jan. 27, 2020, 12 pp.

European Patent Office, Office Action in European Patent Application No. 19177984.2, 6 pp. (Feb. 1, 2022).

China National Intellectual Property Administration, Office Action in Chinese Patent Application No. 202010483983.4, 19 pp. (dated Jun. 6, 2022).

* cited by examiner

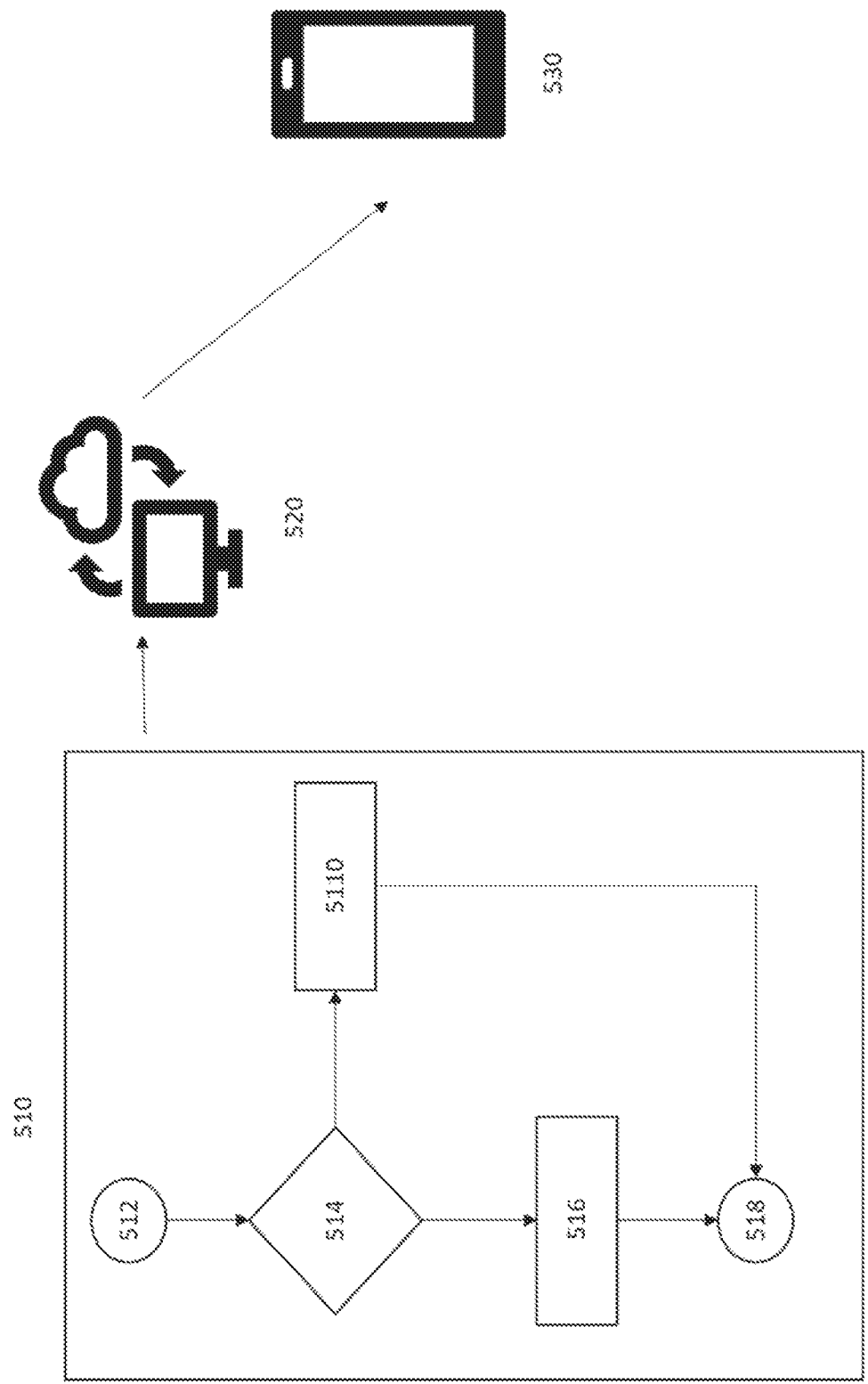

WORKFLOW OF AN APPARATUS

TECHNICAL FIELD

The present application relates to guiding a workflow relating to commissioning and maintenance of an apparatus in an industrial environment.

BACKGROUND OF THE INVENTION

An apparatus that may be used in an industrial environment may have various settings that are to be configured for the apparatus to function properly. The settings may need to be configured differently in various environments and the settings may include multiple parameters and parameter values. To ensure that the settings are configured properly, providing guidance may be beneficial.

BRIEF DESCRIPTION

According to an aspect there is provided a computer-implemented method comprising: obtaining a file comprising a plurality of guidance elements that describe a workflow for configuring an apparatus; connecting to the apparatus and determining a type of the apparatus; translating the workflow to be compatible with the apparatus; translating the guidance elements into computer instructions; and causing the apparatus to be configured by executing the computer instructions.

According to an aspect there is provided an apparatus comprising means for obtaining a file comprising a plurality of guidance elements that describe a workflow for configuring an apparatus; connecting to the apparatus and determining a type of the apparatus; translating the workflow to be compatible with the apparatus; translating the guidance elements into computer instructions; and causing the apparatus to be configured by executing the computer instructions.

According to an aspect there is provided an apparatus comprising at least one processor, and at least one memory including a computer program code, wherein the at least one memory and the computer program code are configured, with the at least one processor, to cause the apparatus to obtain a file comprising a plurality of guidance elements that describe a workflow for configuring an apparatus; connect to the apparatus and determining a type of the apparatus; translate the workflow to be compatible with the apparatus; translate the guidance elements into computer instructions; and cause the apparatus to be configured by executing the computer instructions.

According to another aspect there is provided a system comprising means for creating a workflow by receiving user input for combining a plurality of guidance elements; means for visually displaying the guidance elements and the workflow; means for saving the combination of the plurality of guidance elements into a file; means for obtaining the file using an application comprised in a mobile apparatus; means for executing the plurality of guidance elements combined in the file by the application. In some examples the system comprises a first apparatus that may be a mobile device and a second apparatus that may be an automation device.

According to an aspect there is provided a computer a computer program product which when executed by a computing apparatus causes the apparatus to perform obtaining a file comprising a plurality of guidance elements that describe a workflow for configuring an apparatus; connecting to the apparatus and determining a type of the apparatus; translating the workflow to be compatible with the apparatus; translating the guidance elements into computer instructions; and causing the apparatus to be configured by executing the computer instructions.

According to another aspect there is provided a computer program product comprising computer program code stored in a non-transitory memory medium, the computer program code being configured to cause an apparatus, when executing the program code by a processor circuitry, to perform at least the following: obtain a file comprising a plurality of guidance elements that describe a workflow for configuring an apparatus; connect to the apparatus and determining a type of the apparatus; translate the workflow to be compatible with the apparatus; translate the guidance elements into computer instructions; and cause the apparatus to be configured by executing the computer instructions.

BRIEF DESCRIPTION OF THE DRAWINGS

FIG. 5 illustrates an exemplary embodiment of creating an obtaining a workflow.

DETAILED DESCRIPTION OF THE INVENTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
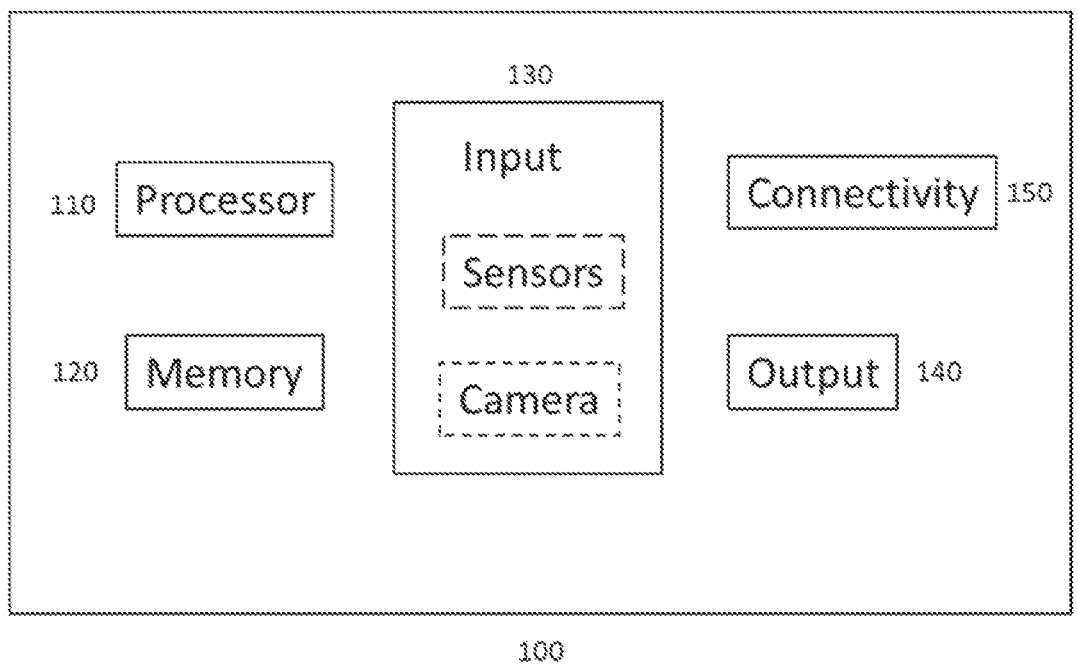
FIGS. 1 and 2 illustrate exemplary embodiments of an apparatus.

FIG. 1 illustrates an exemplary embodiment of an apparatus 100 which may be a mobile device such as a mobile phone, a tablet computer or a laptop. The apparatus 100 may also be an apparatus comprised in a device such as an automation device used in an industrial environment. The units illustrated in FIG. 1 are logical units illustrating the functionalities of the apparatus 100 and the implementation of the functionalities may vary in different embodiments.

The apparatus 100 comprises a processor 110. The processor 110 interprets computer program instructions and processes data. The processor 110 may comprise one or more programmable processors. The processor 110 may comprise programmable hardware with embedded firmware and may, alternatively or additionally, comprise one or more application specific integrated circuits, ASICs.

The processor 110 is coupled to a memory 120. The processor is configured to read and write data to and from the memory 120. The memory 120 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory, Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 120 further stores computer readable instructions that are execute by the processor 110. For example, non-volatile memory stores the computer readable instructions and the processor 110 executes the instructions using volatile memory for temporary storage of data and/or instructions. The memory may also save data such as values.

The computer readable instructions may have been pre-stored to the memory 120 or, alternatively or additionally, they may be received, by the apparatus, via electromagnetic carrier signal and/or may be copied from a physical entity such as computer program product. Execution of the computer readable instructions causes the apparatus 100 to perform various functionalities such as those described in example embodiments of this document.

In the context of this document, a memory or computer-readable media may be any non-transitory media or means that can contain, store, communicate, propagate or transport the instructions for use by or in connection with an instruction execution system, apparatus, or device, such as a computer.

The apparatus 100 further comprises, or is connected to, an input unit 130. The input unit 130 comprises one or more interfaces for receiving input such as user input. The one or more interfaces may comprise for example one or more motion and/or orientation sensors, one or more cameras, one or more accelerometers, one or more microphones, one or more buttons and one or more touch detection units. Further, the input unit 130 may comprise an interface to which external devices may connect to.

The apparatus 100 also comprises an output unit 140. The output unit comprises or is connected to one or more displays capable of rendering visual content such as a light emitting diode, LED, display, a liquid crystal display, LCD and a liquid crystal on silicon, LCoS, display. The output unit 240 may further comprises one or more audio outputs. The one or more audio outputs may be for example loudspeakers or a set of headphones.

The apparatus 100 may further comprise a connectivity unit 150. The connectivity unit 150 enables wired and/or wireless connectivity to external networks such as Bluetooth, Wi-Fi, Ethernet, 4G or 5G. The connectivity unit 150 may comprise one or more antennas and one or more receivers that may be integrated to the apparatus 100 or the apparatus 100 may be connected to. The connectivity unit 150 may comprise an integrated circuit or a set of integrated circuits that provide the wireless communication capability for the apparatus 100. Alternatively, the wireless connectivity may be a hardwired application specific integrated circuit, ASIC.

It is to be noted that the apparatus 100 may further comprise various components not illustrated in the FIG. 1. The various components may be hardware component and/or software components or a combination thereof.

Figure 2:
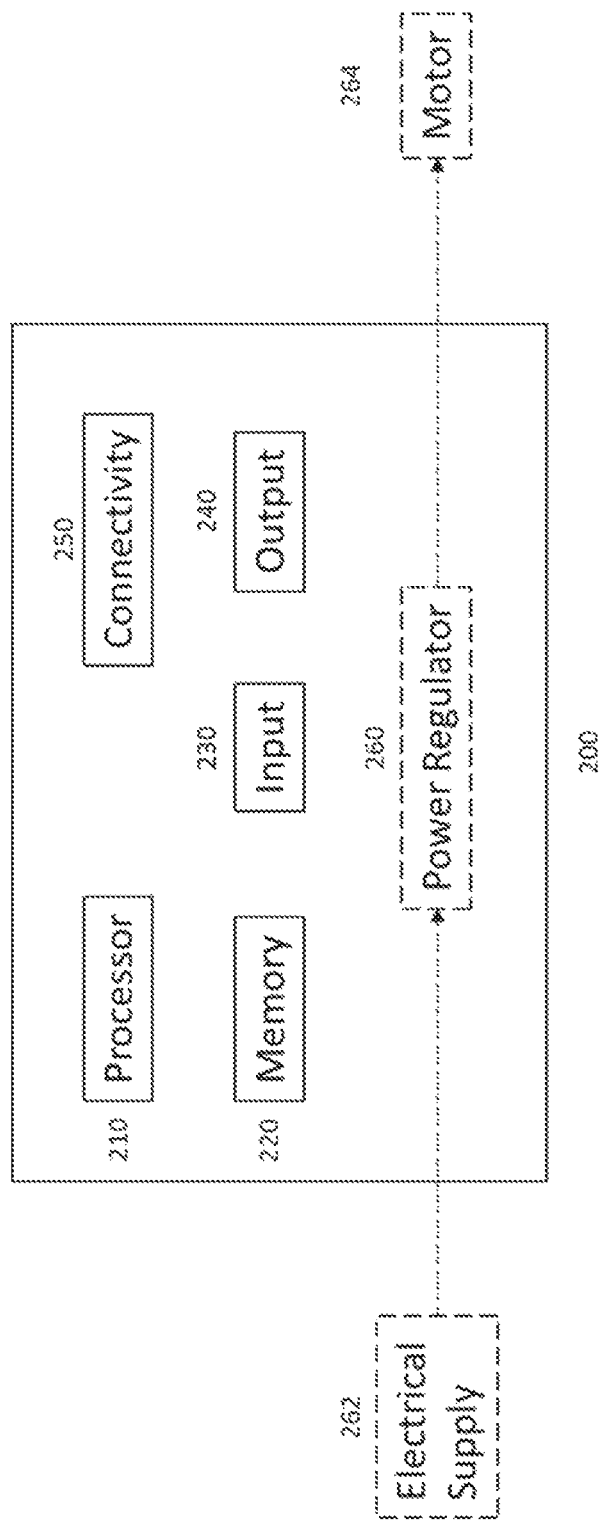

FIG. 2 illustrates an example embodiment of an apparatus 200. The apparatus 200 in this exemplary embodiment is a computing unit that may be comprised in or connected to another apparatus such as an automation device. The units illustrated in FIG. 2 are logical units illustrating the functionalities of the apparatus 200 and the implementation of the functionalities may vary in different embodiments.

The apparatus 200 comprises a processor 210. The processor 210 interprets computer program instructions and processes data. The processor 210 may comprise one or more programmable processors. The processor 210 may comprise programmable hardware with embedded firmware and may, alternatively or additionally, comprise one or more application specific integrated circuits, ASICs.

The processor 210 is coupled to a memory 220. The processor is configured to read and write data to and from the memory 220. The memory 220 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 220 further stores computer readable instructions that are execute by the processor 210. For example, non-volatile memory stores the computer readable instructions and the processor 210 executes the instructions using volatile memory for temporary storage of data and/or instructions. The memory may also save data such as values.

The computer readable instructions may have been pre-stored to the memory 220 or, alternatively or additionally, they may be received, by the apparatus, via electromagnetic carrier signal and/or may be copied from a physical entity such as computer program product. Execution of the computer readable instructions causes the apparatus 200 to perform functionality described above.

In the context of this document, a memory or computer-readable media may be any non-transitory media or means that can contain, store, communicate, propagate or transport the instructions for use by or in connection with an instruction execution system, apparatus, or device, such as a computer.

The apparatus 200 further comprises, or is connected to, an input unit 230. The input unit 230 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 230 may comprise an interface to which external devices may connect to.

The apparatus 200 also comprises an output unit 240. The output unit comprises or is connected to one or more displays capable of rendering visual content such as a light emitting diode, LED, display or a liquid crystal display, LCD. The output unit 240 may further comprise one or more audio outputs. The one or more audio outputs may be for example loudspeakers or a set of headphones.

The apparatus 200 may further comprise a connectivity unit 250. The connectivity unit 250 enables wired and/or wireless connectivity to external networks such as 5G, Bluetooth or Wi-Fi. The connectivity unit 250 may comprise one or more antennas and one or more receivers that may be integrated to the apparatus 200 or the apparatus 200 may be connected to. The connectivity unit 250 may comprise an integrated circuit or a set of integrated circuits that provide the wireless communication capability for the apparatus 200. Alternatively, the wireless connectivity may be a hardwired application specific integrated circuit, ASIC.

In some exemplary embodiments, the apparatus 200 may further comprise a power regulator 260. The power regulator may be connected to an electrical supply 262 that may be located outside the apparatus 200 or alternatively, is comprised in the apparatus 200. The electrical supply provides power to the power regulator 260 which then adjusts the frequency and voltage and then supplies the power to a motor 264. The motor may be located outside the apparatus 200 or it may be comprised in the apparatus 200.

It is to be noted that the apparatus 200 may further comprise various component not illustrated in the FIG. 2. The various components may be hardware component and/or software components or a combination thereof.

An automation device may be a device that is to be used in an industrial environment. The automation device may be one device, or it may comprise a plurality of devices that are connected and/or configured to function together and may therefore be considered as one automation device. An example of such an automation device is for example a heating, ventilation, and air-conditioning, HVAC, device. The automation device may function independent of user input or, alternatively or additionally, a user may guide the functioning of the automation device, at least partly, by providing user input that may be any suitable user input such as press of a button, touch input, gesture input, voice command and so on. The automation device that may be used in an industrial environment may comprise a great amount of settings that determine how the automation device functions. Further, each industrial environment may be different thereby requiring the settings to be customised for that environment in order for the automation device to function properly. Yet, it may not be clear to a user operating the device how the settings should be configured for the automation device to function properly. In such situations it may be beneficial to provide guidance that helps the user to configure the automation device. Configuration may comprise providing correct settings to the automation device by for example providing desired parameter values to one or more parameters comprised in the settings, commissioning the automation device and/or maintaining the automation device.

The settings of an automation device may be configured using an apparatus such as the apparatus 200 for example. The apparatus 200 may be comprised in the automation device or be connected to it. The apparatus 200 may further be configured to connect to another apparatus such as the apparatus 100. The connection may be for example wireless connection such as Bluetooth or Wi-Fi connection, or it may be a wired connection. This may allow a user of the apparatus 100 to control the automation device through the connection between apparatus 100 and apparatus 200. This may be beneficial as the apparatus 100 may then comprise an application for example that helps the user to select correct values for each parameter. For example, the user may select from a drop-down menu a type of motor that is comprised in the automation device and the application then instructs, using the connection, the apparatus 200 to configure correct parameters for that motor type automatically. Yet, as the level of abstraction is raised, the user interface may become application specific and not necessarily helpful in optimally guiding a user to commission or maintain the automation device.

Figure 3:
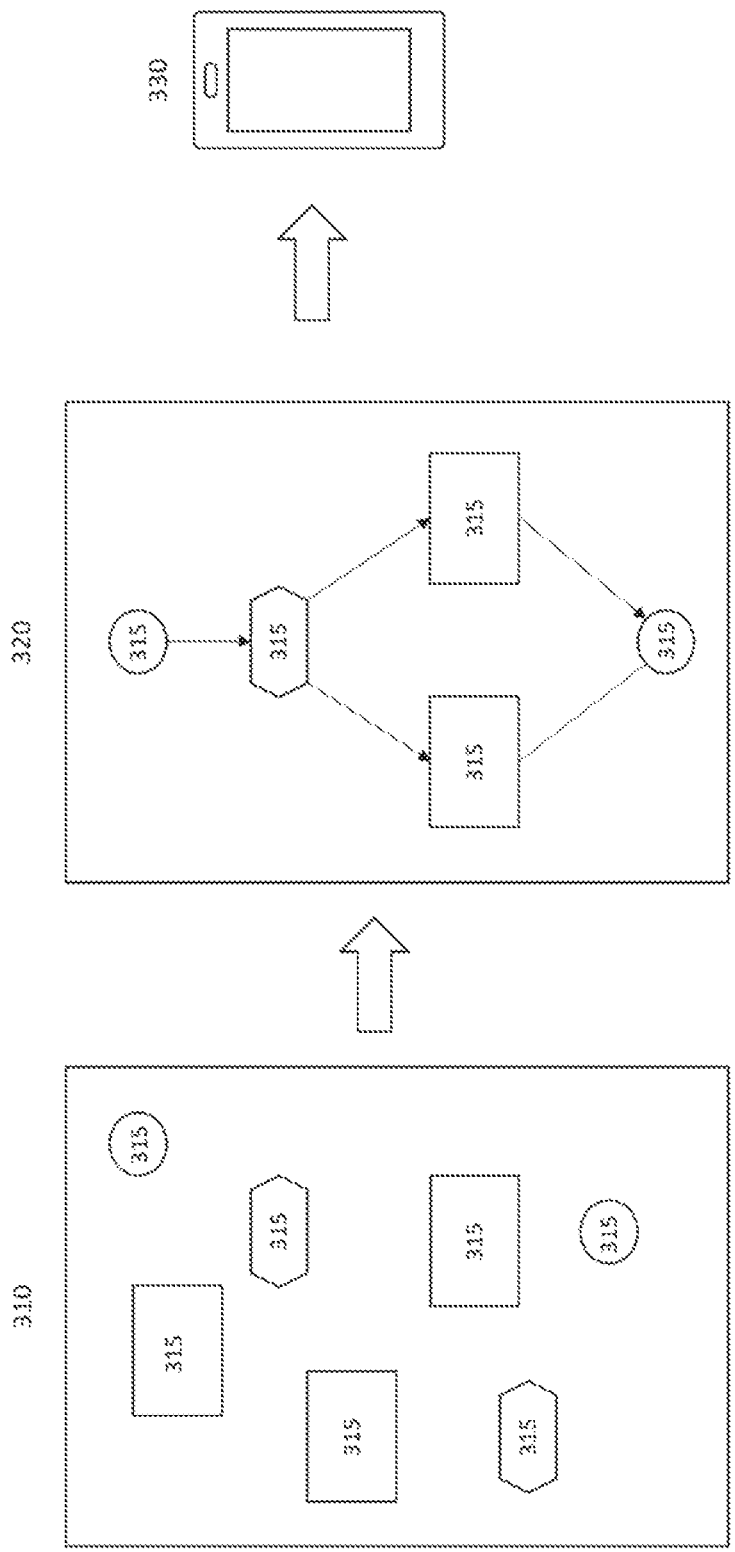
FIG. 3 illustrates an exemplary embodiment of creating a workflow.

FIG. 3 illustrates an exemplary embodiment of a system that provides workflow guidance to a user commissioning or maintaining an automation device. A tool for designing a workflow, a design tool 310, may be provided. The design tool 310 may be a computer-program product that may be stored to a non-transitory medium or it may be obtainable by downloading or the design tool may be executed by a server to which a connection may be established using the Internet for example. The design tool may be executed by a computing device such as a laptop or a tablet computer. The design tool comprises guidance elements 315. A guidance element may be understood as an element that may be visually rendered and that comprises computer instructions or instructions that can be translated into computer instructions by an application, which, when executed by a computing device, cause the computing device to perform a function. The function to be performed may be indicated in the visual rendering of the guidance element 315. A guidance element 315 may comprise for example a logical operator, a state machine or a command or query to for example read and/or change a parameter value, check status or a control command and so on. Using the design tool 310 a user may combine various guidance elements. The combining may take place for example by dragging and dropping, by selecting from a list or by using any other suitable means for providing user input. The user may also add to the workflow other elements such as images, text and/or state machines not comprised in any guidance element.

If one user is familiar with an automation device and knows how it may be best configured to one or more environments, he may utilize the design tool 310 to convey his knowledge to others as well. By combining the guidance elements 315, the user may create a workflow 320 that helps others to configure the automation device when for example commissioning or maintaining the automation device. For example, the guidance elements 315 may be combined to describe a workflow that comprises a start, a decision point such as "if pump type is A, then set parameter value to X" and/or "if a value is yes, then do B", a stop point and so on. The workflow 320 may be visual thereby helping the user to review the designed process and make edits as needed. The design tool 310 therefore may enable a user to quickly create various workflows for various targets such as various automation devices used for various purposes in various industrial environments. In some exemplary embodiments, the workflow may further be configured to verify if at least some of the settings of the automation device are correct and to provide output indicating incorrect settings, if any, identified.

Once the workflow 320 is ready it may be saved as a file comprising the selected guidance elements 315. The guidance elements 315 comprised in the workflow may be linked to each other in a certain order. The file may be a descriptor file. The file may then be saved onto the computing device that was used to execute the design tool 310 and/or the file may be transmitted to another device such as a mobile device 330 and/or the file may be uploaded to a cloud from which it may be downloaded by, for example, the mobile device 330. The file may be such that an application may be configured to translate the file into a workflow by translating the guidance elements such that the automation device may be configured as was planned by the user who designed the workflow. The application may be called as deployment application and it may be executed by the mobile device 330 that may be or may comprise the apparatus 100. The automation device on the other hand may be or may comprise the apparatus 200.

The deployment application may be configured to connect to the automation device using the connecting unit of the mobile device 330. The deployment application may further be configured to determine the type of automation device it is connected to and to which the file is targeted. This enables the deployment application to determine which communication protocol to use for example as it may be different for different automation devices. Further, the deployment application may be configured, in some exemplary embodiments, to verify that the user is authorized to execute the workflow. This may be beneficial to ensure that an unauthorized user does not cause harm to the automation device for example by not understanding the consequences of various parameter values. The workflow defined by the guidance elements 315 comprised in the file may involve user interaction such as asking a user to provide user input in terms of accepting certain parameter values and so on so it may be beneficial to ensure that only authorized user may provide the user input.

As mentioned, different automation devices may use different parameters and/or different communication protocols and so on. The deployment application may determine the type of automation device, the parameters and communication protocols used for example by accessing information regarding parameters and communication protocols used in a certain automation device stored in a memory. The memory may be that of the mobile device 300, of the automation device or the memory of a back-end such as a cloud. The deployment application may further access, in a similar manner, information regarding how the various parameters map to the guidance elements 315 comprised in the file. This enables the deployment application to translate the designed workflow to be compatible with the automation device it is connected to.

The connection between the deployment application and the automation device may be implemented using any suitable connecting means. The connection may be for example wireless connection such as Bluetooth or Wi-Fi connection, or it may be a wired connection.

Figure 4:
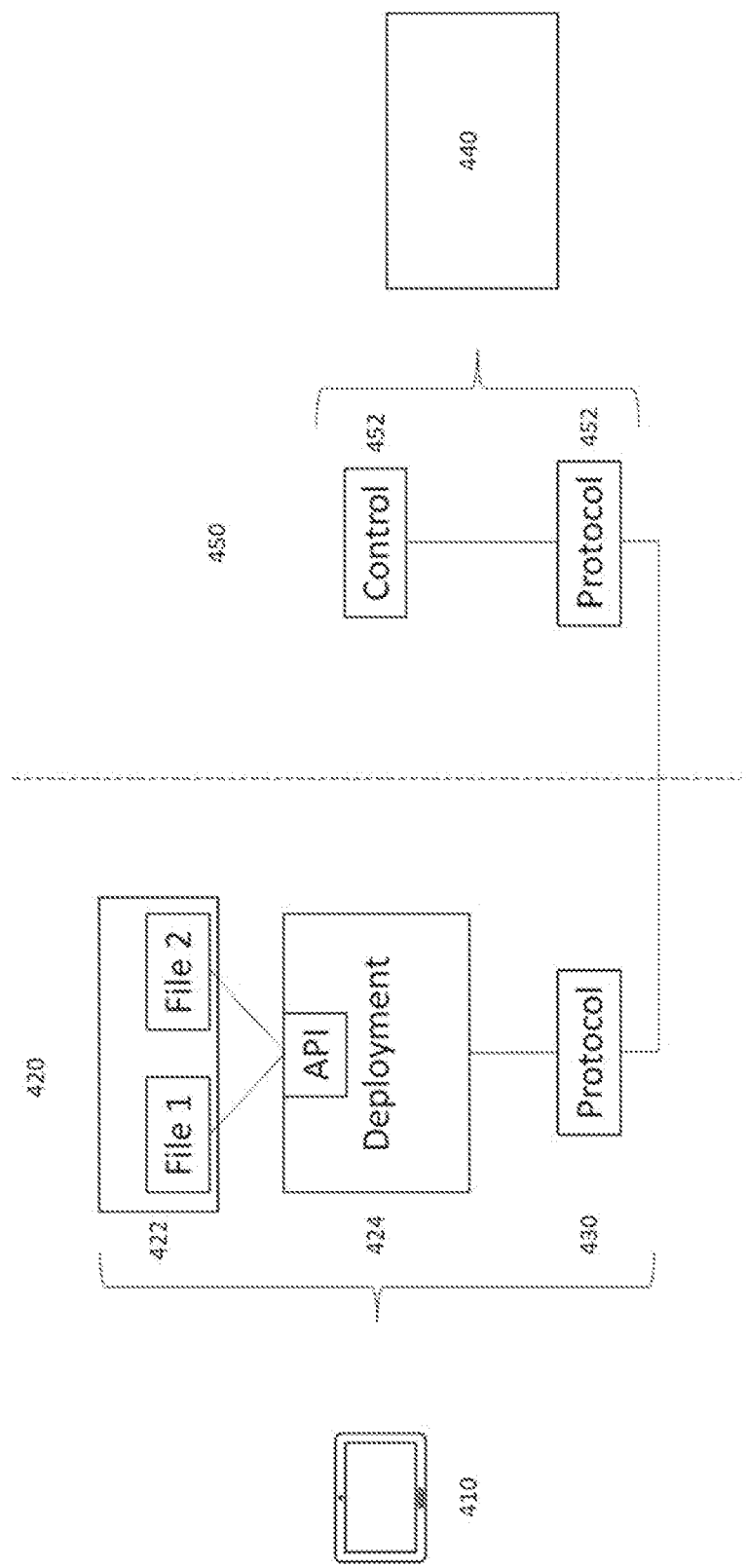
FIG. 4 illustrates an exemplary embodiment of protocol stacks.

FIG. 4 illustrates an exemplary embodiment of a protocol stack 420 in a mobile device 410 and a protocol stack 450 in an automation device 440. In this exemplary embodiment, a mobile device 410 is a tablet computer. The mobile device 410 comprises an application 424 that is a deployment application. The deployment application 424 comprises an application programming interface that is configured such that a descriptor file may be translated and executed by the deployment application 424. A descriptor file, that may have been implemented using a design tool such as the design tool 310 and which comprises a workflow defined by one or more guidance elements, may be obtained from a remote location 422 that may comprise multiple different descriptor files. The remote location may be for example a server or a service that is could-based. Once a descriptor file has been obtained and is executed by the deployment application 424, the execution may involve one or more functions that require a connection to the automation device 440. The connection may be established using resources of a connectivity unit of the mobile device 410 and a connectivity unit of the automation device 440. The connection may be wireless or a wired connection. The connection is established according to the communication protocols 430 and 452. The communication protocols 430 and 452 define a set of rules that define how the connection between the apparatus 410 and the automation device 440 is to be established. After the communication protocol 452, there is in the protocol stack 450 a control 452 layer that may be configured to execute functions related to the automation device 440 that are defined in the descriptor file.

A benefit that may be achieved by the descriptor files is that once the deployment application 424 has been installed to the mobile device 410, no other software needs to be installed. As the deployment application may be configured to be compatible with various types of automation devices, obtaining a descriptor file that defines the desired workflow for a target automation device 440 and executing the descriptor file using the deployment application may be sufficient if the target automation device is included in the various types of automation devices the deployment application is configured to be compatible with. This enables a user to use the mobile device 410 at various locations and with different automation devices. The descriptor file may, when executed, define correct configuration according to the workflow described in the descriptor file, to the automation device automatically without user input. Alternatively, the descriptor file, when executed by the deployment application, may provide output that invites the user to provide user input. The provided user input may then be used as a basis for configuring one or more settings of the automation device. Settings may be understood to comprise one or more parameter to which a parameter value is to be provided and/or selected. For example, the workflow comprised in the descriptor file may be used to commission and/or maintain an automation device and/or the workflow may guide a user to commission and/or maintain an automation device.

In an exemplary embodiment illustrated in FIG. 5, a pump is to be integrated to an automation system comprising an automation device comprising an apparatus such as the apparatus 200. In some exemplary embodiments, the automation system is the automation device. The vendor of the pump may provide a design tool 510 that comprises various workflow elements that may be combined to form a workflow. The workflow may then be saved as a descriptor file that may be uploaded to a cloud-based service 520 from which a mobile device 530 may obtain the descriptor file.

A user that is familiar with how the pump is to be integrated to the automation system may now use the design tool 510 to design a workflow for commissioning the pump as part of the process to integrate the pump to the automation device. Optionally, the user may need to be authenticate such that it is ensured that the user is authorized to use and/or create a descriptor file using the deployment tool.

The user may then use the design tool 510 to combine various guidance elements to create the workflow. The user may do the combining by providing user input such as mouse clicks, dragging and dropping, touch input, key presses and so on. In this exemplary embodiment, the use defines the start of the workflow by selecting the guidance element 512 that is a start command. The user then connects the guidance element 512 to the guidance element 514 that is a selector defining that if the pump type is X then proceed to guidance element 516, otherwise proceed to guidance element 5110. Guidance element 516 defines that a parameter value for parameter 1 is to be set to 5.69 and the guidance element 5110 defines that the parameter value for the parameter 1 is to be set to 2.34. The guidance element 516 and the guidance element 5110 are both then connected to the guidance element 518. The guidance element 518 defines the end of the workflow.

Once the user has defined the workflow, the workflow may be, in some exemplary embodiments, verified by the design tool 510. The design tool may be configured to verify that the workflow is safe for example by verifying that the parameter settings are defined to be in a safe range, the order of the guidance elements is sensible and/or safe and so on. Further, in some exemplary embodiments, the user may visually view, using the design tool 510, the workflow he has designed. The design tool 510 may have the benefit of enabling the user to quickly create a workflow that may help another user to commission and/or maintain an automation device. This way, the user creating the workflow and the other user do not have to even know each other and/or be in the same location. Once the workflow has been designed, a descriptor file comprising the workflow may be uploaded to a cloud-based service 520 from which it may be downloaded to a deployment application that is installed in the mobile apparatus 530.

In some exemplary embodiments, the could-based service 520 may be configured to provide a notification to the mobile apparatus 530 once a descriptor file that is of interest to the user of the mobile apparatus 530 has become available on the cloud-based service 520.

Even though the invention has been described above with reference to exemplary embodiments according to the accompanying drawings, it is clear that the invention is not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described exemplary embodiments may, but are not required to, be combined with other exemplary embodiments in various ways. The scope of protection sought for various embodiments of the invention is set out by the independent claims. If any exemplary embodiments and features described in this specification should not fall under the scope of the independent claims, those are to be interpreted as examples useful for understanding various embodiments of the invention.

The invention claimed is:

1. A computer-implemented method comprising:
    obtaining, by a mobile device, a file comprising a plurality of guidance elements that describe a workflow for configuring an apparatus, wherein the apparatus is an automation device;
    obtaining the file to a deployment application comprised in the mobile device;
    connecting, using the deployment application, to the apparatus and determining, by the deployment application a type of the apparatus, parameters and communication protocol used by the apparatus;
    translating, by the deployment application, the workflow to be compatible with the apparatus based on the type of the apparatus and parameters and communication protocol used by the apparatus;
    translating the guidance elements into computer instructions; and
    causing the apparatus to be configured by executing the computer instructions.

2. The computer-implemented method according to claim 1, wherein the workflow for configuring the apparatus is for commissioning the apparatus.

3. The computer-implemented method according to claim 1, wherein the workflow for configuring the apparatus is for maintaining the apparatus.

4. The computer-implemented method according to claim 1, further comprising determining if one or more settings of the apparatus are correct and if one or more settings are incorrect, providing an output to indicate the one or more incorrect settings.

5. The computer-implemented method according to claim 1, wherein the file is obtained by downloading it to an application comprised in a mobile device.

6. An apparatus comprising at least one processor, and at least one memory including a computer program code, wherein the at least one memory and the computer program code are configured, with the at least one processor, to cause the apparatus to:
    obtain, by a mobile device, a file comprising a plurality of guidance elements that describe a workflow for configuring another apparatus, wherein the apparatus is an automation device;
    obtain the file to a deployment application comprised in the mobile device;
    connect, using the deployment application, to the apparatus and determining, by the deployment application, a type of the other apparatus, parameters and communication protocol used by the apparatus;
    translate, by the deployment application, the workflow to be compatible with the other apparatus based on the type of the apparatus and parameters and communication protocol used by the apparatus;
    translate the guidance elements into computer instructions; and
    cause the other apparatus to be configured by executing the computer instructions.

7. The apparatus according to claim 6, wherein the workflow for configuring the other apparatus is for commissioning the other apparatus.

8. The apparatus according to claim 7, wherein the connecting to the other apparatus is done using a wireless connection.

9. The apparatus according to claim 6, wherein the workflow for configuring the other apparatus is for maintaining the other apparatus.

10. The apparatus according to claim 9, wherein the apparatus is further caused to determine a plurality of parameters comprised in the other apparatus.

11. The apparatus according to claim 6, wherein the apparatus is further caused to determine of one or more settings of the other apparatus are correct and if one or more settings are incorrect, provide an output to indicate the one or more incorrect settings.

12. The apparatus according to claim 6, wherein the file is a descriptor file.

13. A system comprising a design tool and a computing device and the design tool is executed by the computing device, wherein the system is caused to:
    create a workflow by receiving user input for combining a plurality of guidance elements;
    display visually the guidance elements and the workflow;
    save the combination of the plurality of guidance elements into a file;
    obtain the file using a deployment application comprised in a mobile apparatus; and
    execute the plurality of guidance elements combined in the file by the deployment application, wherein the deployment application is configured to determine a type of the apparatus, parameters and communication protocol used by the apparatus, and to translate the file into a workflow, that is compatible with the apparatus based on the type of the apparatus and parameters and communication protocol used by the apparatus, by translating the guidance elements for configuring an automation device and the execution involves one or more functions that require a connection to the automation device.

14. The system according to claim 13, further caused to upload the file to a cloud-based service.

15. The system according to claim 13, further caused to verify the workflow.

16. The system according to claim 13, further caused to provide an indication once the combination of the plurality of guidance elements into have been saved to the file.

17. A computer program product comprising computer program code stored in a non-transitory memory medium, the computer program code being configured to cause an apparatus, when executing the program code by a processor circuitry, to perform at least the following:

obtain, by a mobile device, a file comprising a plurality of guidance elements that describe a workflow for configuring an apparatus; connect to the apparatus and determining a type of the apparatus, wherein the apparatus is an automation device;

obtain the file to a deployment application comprised in the mobile device;

connect, using the deployment application, to the apparatus and determining, by the deployment application a type of the apparatus, parameters and communication protocol used by the apparatus;

translate, by the deployment application, the workflow to be compatible with the apparatus based on the type of the apparatus and paraments and communication protocol used by the apparatus;

translate the guidance elements into computer instructions; and cause the apparatus to be configured by executing the computer instructions.

\* \* \* \* \*